J. W. OZOLS.
MEANS FOR AUTOGRAPHING SENSITIVE PHOTOGRAPHIC MATERIAL.
APPLICATION FILED JUNE 12, 1918.

1,376,032.

Patented Apr. 26, 1921.
3 SHEETS—SHEET 1.

WITNESSES:
Alexis E. Boldaroff
Lillian M. Alling

INVENTOR
John W. Ozols
BY
Chamberlain & Newman
ATTORNEYS

J. W. OZOLS.
MEANS FOR AUTOGRAPHING SENSITIVE PHOTOGRAPHIC MATERIAL.
APPLICATION FILED JUNE 12, 1918.
1,376,032.
Patented Apr. 26, 1921.
3 SHEETS—SHEET 2.
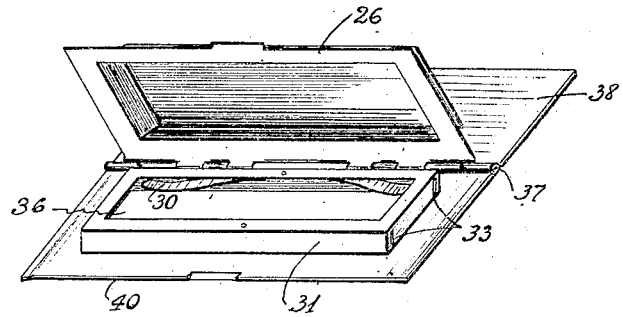
*Fig. 5*
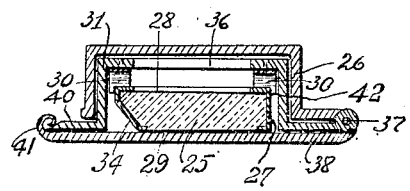
*Fig. 6*
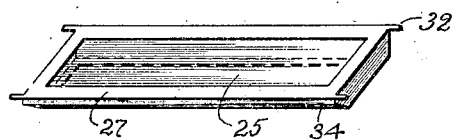
*Fig. 7*
*Fig. 8*  *Fig. 9.* 
WITNESSES:
Alexis E. Boldakoff
Lillian M. Alling
INVENTOR
John W. Ozols
BY
Chamberlain & Newman
ATTORNEYS

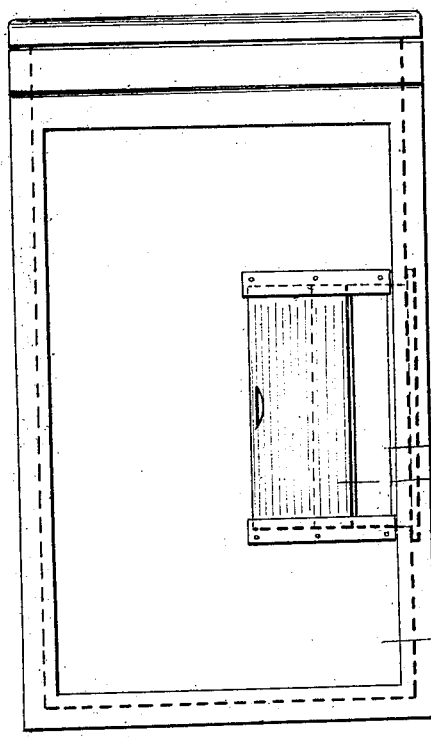
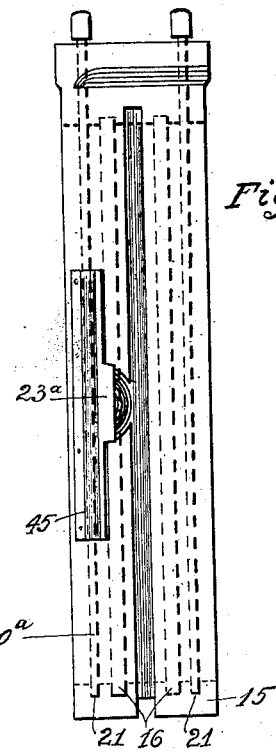
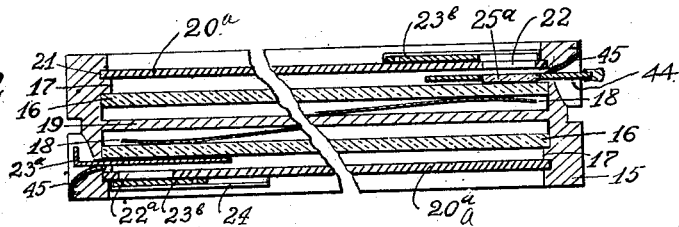
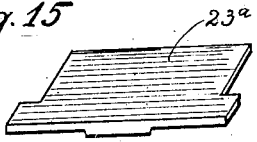
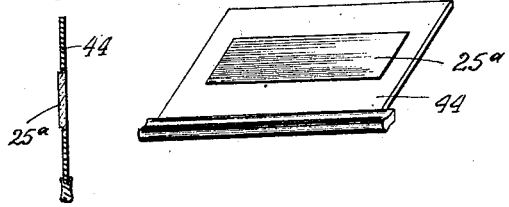

UNITED STATES PATENT OFFICE.

JOHN W. OZOLS, OF BRIDGEPORT, CONNECTICUT.

MEANS FOR AUTOGRAPHING SENSITIVE PHOTOGRAPHIC MATERIAL.

1,376,032.

Specification of Letters Patent.  Patented Apr. 26, 1921.

Application filed June 12, 1918. Serial No. 239,616.

*To all whom it may concern:*

Be it known that I, JOHN W. OZOLS, a citizen of Russia, and resident of Bridgeport, in the county of Fairfield and State of Connecticut, have invented certain new and useful Improvements in Means for Autographing Sensitive Photographic Material, of which the following is a specification.

My invention relates to new and useful improvements in photography and particularly to means for autographing sensitive photographic material such as dry plates and films prior to developing the same.

It is the object of the invention to produce a simple and inexpensive device whereby autographs, names and other characters may be applied to photographic plates before or after exposures have been made so that when the print is made said autographs, names or other designating marks may be printed with and upon the picture to be developed, or beneath the same, and without the use of a camera, and to construct the device so as to accomplish the purpose by novel mechanism, that can be easily manipulated and with comparatively little expense.

This device is particularly applicable for producing autographs or applying other distinguishing record marks on photographic plates, such as films and dry plates and particularly those used in a commercial way, as employed by engineers, naturalists and in factory practice where records are kept.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows a broken plan view of a plate holder having my improved autographic attachment applied thereto.

Fig. 5 shows a perspective view of the attachable housing, in an open position, for carrying the ground glass, illustrated in Figs. 1 and 2.

Fig. 6 is an enlarged detached cross sectional view of the ground glass holder in a closed position, taken on line 6—6 of Fig. 1.

Fig. 7 is a detached perspective view of the ground glass shown in Figs. 2 and 6.

Fig. 8 shows a perspective view of a spring that is also shown in Figs. 2, 5 and 6, for pressing the ground glass down against the dark slide and dry plate.

Fig. 9 is a spring for normally holding the cap to the housing closed, for protecting the ground glass.

Fig. 10 shows a plan view of a modified form of construction, illustrating a somewhat simpler form of autographic device.

Fig. 11 is an edge view of the device shown in Fig. 10.

Fig. 12 shows upon an enlarged scale, a broken cross section of the construction shown in Figs. 10 and 11.

Figs. 13 and 14 show a detail perspective and cross sectional view of the ground glass holder, shown in Fig. 12.

Fig. 15 is a detached perspective view of the inner shutter or closure slide shown in lower portion of Fig. 12, and Fig. 16 is a detached perspective view of the spring plate shown in Figs. 11 and 12.

Figure 1:
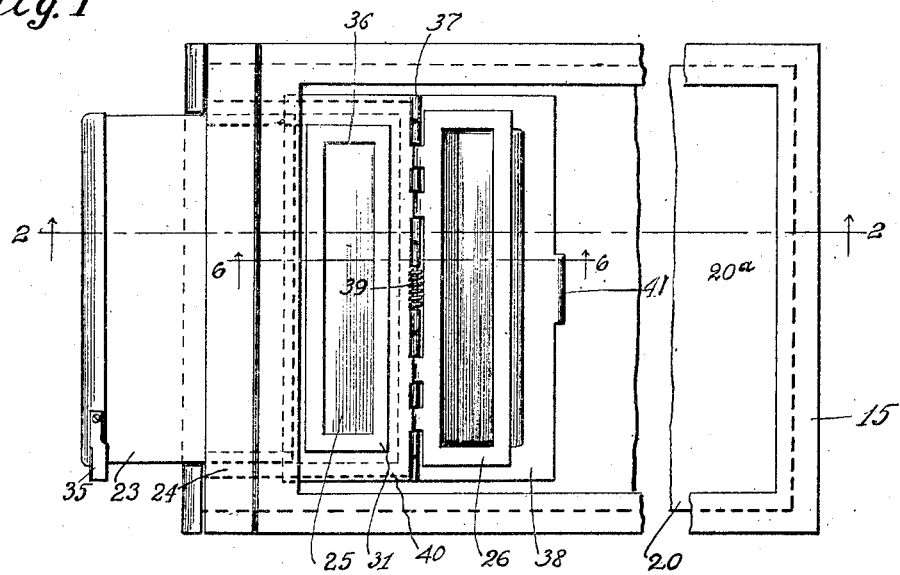

In the drawings I have shown two ways of carrying out my invention, both of which employ ground glass upon which the autograph or other writing is applied, and includes means for positioning the same against the dry plate and I further provide convenient means for exposing the dry plate or film through the ground glass, whereby the said written matter is printed upon the dry plate and made a part of the pictures to be thereafter printed from the dry plate.

In the drawings, 15 represents the plate holder, which may be of a standard construction, for supporting the dry plates against the shouldered portion 17 of the frame against which it is snugly held in said position by means of the spring 18 mounted upon the central plate 19 secured in the central portion of the plate holder. An additional spring 43 holds the plates against endwise displacement.

20 represents a dark slide which is slidably mounted in grooves 21 in the inner edge of the holder. When exposing the dry plate in a camera the dark slide 20 is drawn back in the usual way, but is not drawn out entirely, leaving its end portion 20$^a$ covering the end portion of the dry plate in a manner to protect the same from exposure and reserving it for autographic development. This dark slide is provided with an elongated opening 22, that is normally covered by a small shutter 23 slidably mounted in ways 24 of the dark slide and fitted to be closed against the top side thereof. This shutter is adapted to be drawn in and out to cover and uncover the opening 22 and to allow the ground glass 25 upon which the autograph is applied to be positioned in the opening and against the sensitive side of the dry plate 16.

In this connection it may be explained that when the ground glass has been positioned as suggested the closure cap 26 is opened and the ground glass uncovered and exposed, for a few seconds, in a way to expose that portion of the sensitive material of dry plate covered thereby, and to print upon the dry plate the autograph written on the ground glass. This ground glass 25 upon which the autographs are written, is preferably formed of colored glass and is protectively supported within a light sheet metal frame 27 which incloses its edge portions only leaving the two side faces 28 and 29 exposed as is clearly shown in Figs. 2 and 6.

Figure 2:
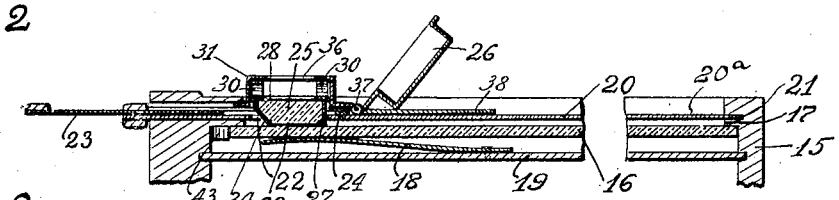
Fig. 2 is a vertical broken sectional view of the plate holder and attached ground glass housing shown on line 2—2 in Fig. 1.
Figure 3:
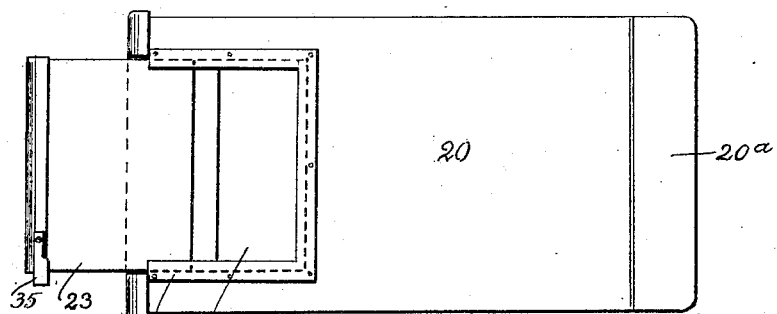
Fig. 3 shows a detached plan view of the dark slide with attached small shutter, shown in Figs. 1 and 2.
Figure 4:
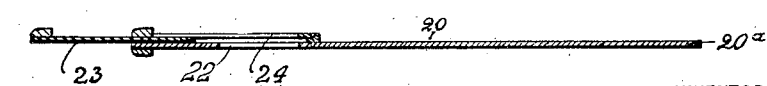
Fig. 4 is a central vertical longitudinal sectional view of the slides shown in Fig. 3.

The ground glass 25 including its casing is of a size sufficiently small to enter the opening 22 and seat its under face 29 against the face of the dry plate when the shutter 23 is withdrawn, see Fig. 2. Springs 30 secured within the housing 31 press against the top side of the ground glass frame and serve to shove the same down into the opening when the shutter is drawn out. Small guide pins 32 formed on the ground glass frame are loosely fitted in slots 33 in the housing to better guide the ground glass in its movement toward and from the dry plate. One edge portion 34 of the ground glass frame is formed on an incline so that when the shutter is shoved in the ground glass will be engaged and raised out of the opening 22. The shutter slide 23 is provided with a small spring 35 to engage the face of the frame for the purpose of retaining the slide in a closed position.

The housing 31 is formed to receive the incased ground glass and is detachably connected to the frame for the purpose of autographing the sensitive plates. The housing 31 is provided with an opening 36 upon the top side, which alines with the opening 22 and the bared face 28 of the ground glass so as to allow the light to strike through when the closure cap 26 is turned back upon its pintle 37 as shown in Figs. 1 and 2. A bottom member 38 is also hinged to the pintle 37 of the housing and serves as a means for closing the housing when not applied to the plate holder, but is laid back out of the way when in use for printing as indicated in Fig. 1. A spring 39 shown in Figs. 1 and 9 is mounted upon the pintle 37 in a way to engage both the housing and closure lid for the purpose of keeping it closed.

This housing, as will be seen, consists of three principal parts, the main housing 31 having the opening 26 and provided with flanges 40, the rear edge portion of which is turned up to receive the pintle 37 to which both the cap 26 and the bottom member 38 are attached. The front portion of the bottom 38 is turned over at 41 to engage and snap over the edge of the cap so as to inclose the ground glass when not in use. The ground glass can be used over and over again by, in the first instance, writing thereon in pencil or other erasable writing material and then removing the writing from the glass when the printing on the sensitive material has been complete, leaving the ground glass clean for another autograph.

Two springs 30 as shown in Fig. 8 are employed in the housing to press against the ground glass, and each of these springs is provided with integral flanges 42 that engage the edges of the ground glass frame for the purpose of holding the same in alinement.

The modified form of construction shown in Figs. 10 to 16 inclusive, shows a more complete construction of plate holder and is provided with two separate autographic devices, which, however, are alike in construction and method of operation. Two springs 18 are provided for the dry plates to hold the same in position against the shoulders 17. The dark slides 20$^a$ are provided with movable shutters 23$^a$ and 23$^b$ to cover the opposite sides of the openings 22$^a$, until both the sensitive slide and the ground glass have been positioned preparatory to exposing the writing of the latter upon the sensitive side of the dry plate. The ground glass 25$^a$ in this form is supported within a holder 44 that is slidably fitted in ways upon the inner side of the dark plate from that in which the shutter is mounted so that when the shutter is drawn out the opening will be uncovered and the light permitted to strike through the ground glass and upon the sensitive material of the plate as will be apparent from Fig. 12. Small spring plates 45 are secured to outer edge portions of the plate frame in position and for the purpose of closing the opening left when the ground glass holder 44 is withdrawn.

While the detail construction of the manner of using the ground glass in this form of apparatus is somewhat different yet the general principle and method of printing is the same and essentially includes the use of ground glass upon which the autographs may be removably written.

The method of using my improved autographic device as shown in the preferred construction is as follows: Presuming it is desired to make a record on the face of the end portion of a dry plate or film, after an exposure has been made, it will first be necessary to reserve an unexposed part of the dry plate, which can be done by covering and protecting such part of the plate when it is exposed in the camera. The next operation is to prepare the ground glass for position and printing upon the dry plate; this is done by first writing such record upon the under side 29 of the glass, while it is contained within the housing, and then closing the housing and attaching it to the holder 15 by sliding the forward edge portion 40 under the edge of the frame as seen in Figs. 1 and 2 so as to position the housing and its ground glass over the opening 22. The shutter is then drawn out and the ground glass allowed to be forced down into the opening by the springs 30 so that the face 29 will lie flush against the face of the dry plate. The closure cap is then opened to expose the ground glass for printing the autograph upon the dry plate. The ground glass is preferably made from protective colored glass so as to not allow the light passing through to be too intense and only a very short time exposure is necessary to cause the desired printing. After the printing has been completed as above, the closure cap is again closed and the shutter then shoved back in position, when its inner end first engages the inclined edge 34 of the ground glass frame in a manner to cause it to raise out of the opening which is then completely closed by the shutter in a way to fully cover and protect the dry plate.

Having thus described my invention, what I claim and desire to secure by Letters Patent, is,

1. In a photographic autographic device the combination with means for inclosing and supporting a sensitive plate including a dark slide having an opening therein, a removable shutter for covering said opening, a ground glass for positioning in the opening, means for inclosing and positioning the ground glass comprising a housing having openings in its opposite sides, a closure cap covering the open side of the housing through which light is admitted, a movable bottom for covering the under side of said housing, and springs interposed between the housing and ground glass for forcing the latter into the opening of the dark slide when the shutter is withdrawn.

2. In a photographic autographic device the combination with means for inclosing and supporting a sensitive plate including a dark slide having an opening therein, a ground glass covered on all but two sides and having a bevel edge, a removable shutter mounted in the dark slide in position to cover the opening and to engage the beveled edge of the ground glass, means for inclosing and positioning the ground glass in the opening comprising a housing having openings in its opposite sides, a closure cap covering the open side of the housing through which light is admitted, a movable bottom for covering the under open side of the said housing, and springs between the housing and ground glass for forcing the latter into the opening of the dark slide when the shutter is withdrawn.

3. In a photographic autographic device the combination with means for inclosing and supporting a sensitive plate inclosing a dark slide having an opening therein, a receptacle having means for attachment to the face of the dark slide and over its opening and including a housing having two open sides, a ground glass movably mounted in the housing, a removable shutter mounted in the dark slide in position to cover the opening and to engage the edge of the ground glass, a removable closure cap covering the open side of the housing, springs between the housing and ground glass for forcing the latter into the opening of the dark slide when the shutter is withdrawn.

4. In a photographic autographic device the combination with means for inclosing and supporting a sensitive plate including a dark slide having an opening therein, a removable shutter for covering said opening, a ground glass for positioning in the opening, a housing for inclosing the ground glass and having openings in its opposite sides, a closure cap covering the open side of the housing through which light is admitted, a movable bottom for covering the under side of said opening, and springs for positioning the ground glass within the opening of the dark slide and against the sensitive plate.

5. In a photographic autographic device the combination with means for inclosing and supporting a sensitive plate including a dark slide having an opening therein, a removable shutter for covering said opening, a ground glass upon which to draw the character to be printed, a closure member for covering the side of the ground glass, and springs for forcing the ground glass against the dark slide.

Signed at Bridgeport, in the county of Fairfield and State of Connecticut, this 11th day of June A. D., 1918.

JOHN W. OZOLS.

Witnesses:
    ALEXIS E. BOLDAKOFF,
    C. M. NEWMAN.